(No Model.)
E. D. WEYBURN.
LOOSE PULLEY.
No. 253,797. Patented Feb. 14, 1882.
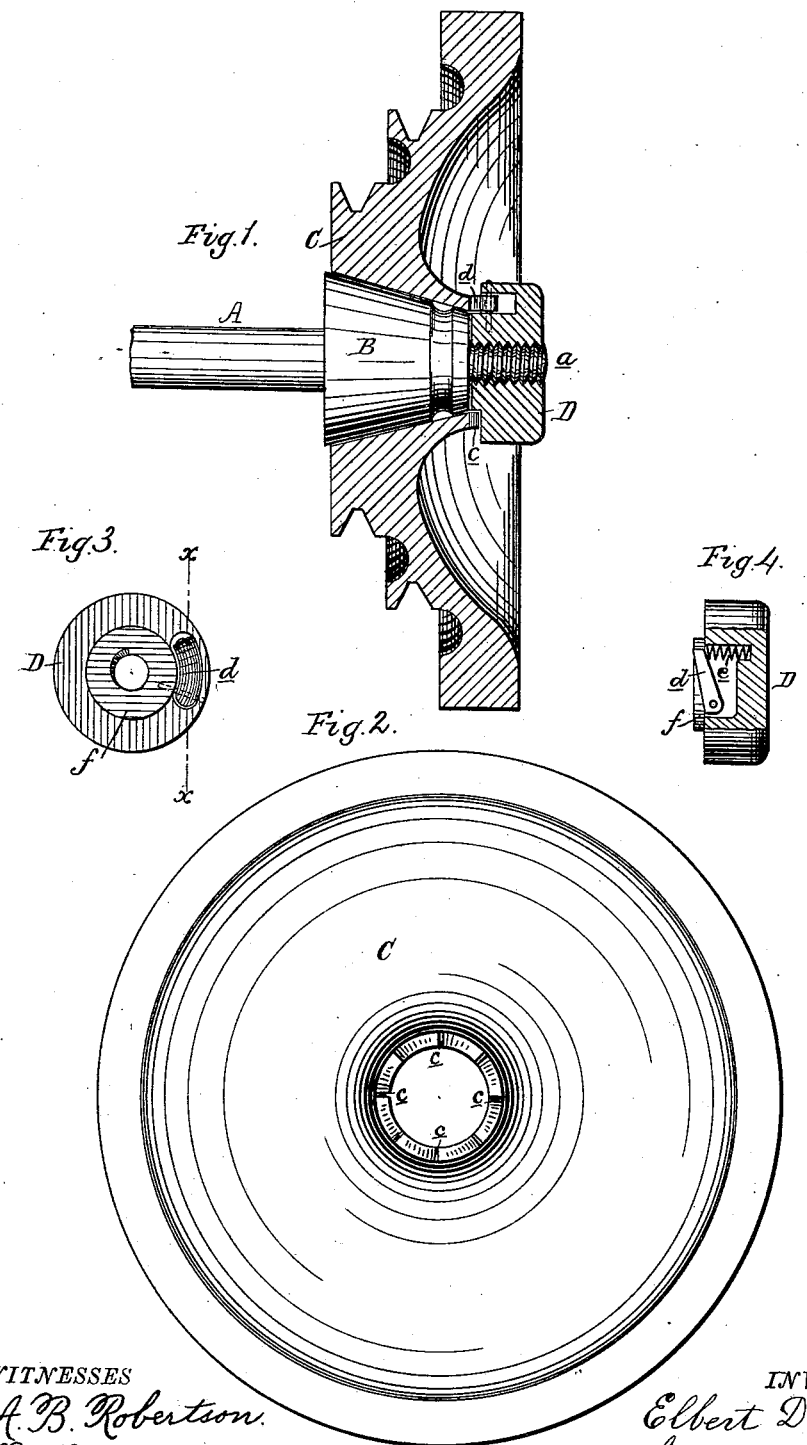
WITNESSES
A. B. Robertson.
R. Robertson.
INVENTOR
Elbert D Weyburn
by T. J. W. Robertson
Attorney

UNITED STATES PATENT OFFICE.

ELBERT D. WEYBURN, OF ATLANTA, GEORGIA.

LOOSE PULLEY.

SPECIFICATION forming part of Letters Patent No. 253,797, dated February 14, 1882.

Application filed September 7, 1881. (No model.)

*To all whom it may concern:*

Be it known that I, ELBERT D. WEYBURN, a citizen of the United States of America, residing at Atlanta, in the county of Fulton and State of Georgia, have invented certain new and useful Improvements in Loose Pulleys; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improvement in that class of loose pulleys which are provided with ratchet-and-pawl connections to admit of their revolving loose upon the shaft when turning in one direction and becoming automatically fastened upon the shaft when turning in the opposite direction; and the invention consists in the peculiar construction and arrangement of parts.

In the drawings, Figure 1 is a vertical section of a pulley constructed according to my improvement. Fig. 2 is a face view of the pulley detached. Fig. 3 is a view of the under side of the nut detached, and Fig. 4 is a section of the nut through the line $x\ x$ in Fig. 3.

A represents a shaft, having preferably a conical enlargement, B, formed at or near its end; but this may be dispensed with, if desired, and the shaft formed as usual; but in such case there should be a collar or some equivalent device to keep the pulley C in proper position. The pulley C is made with a tapering or a straight hole, as the case may be, so as to fit the shaft, and has formed on it a series of ratchet-teeth at $c$, into which catches a pawl, $d$, pivoted in the nut D, and forced against the teeth $c$ of the wheel by a spring, $e$, setting in a recess in the nut. This nut D is fitted upon a screw, $a$, formed at the extreme end of the shaft, and has a projection, $f$, that passes into the aperture through the pulley and bears on the end of the conical part of the shaft. If preferred, the nut may be provided with teeth and the pawl pivoted in the pulley; but I prefer the arrangement shown. By this construction of the pulley and nut motion may be given to the pulley without operating the shaft, when the pulley is turned in one direction, as the pawl slips over the teeth; but on reversing the motion of the pulley the pawl catches in the teeth, and the shaft is compelled to turn with the pulley. The tapering shaft and the hole in the pulley fitting it admit of the two being readily fitted together when made, and by filing off the face of the projection $f$ the pulley and shaft can be accurately refitted together in case the rubbing-surfaces should become worn. Besides this ease of refitting, the conical bearing for the wheel will be found peculiarly adapted for use with the pawl, &c., because when the pawl catches into the teeth of the wheel it forces the pulley farther upon the conical portion of the shaft, and thus makes it fit tighter, and, tending to hold the two together by friction, prevents all the strain of running the machine from coming upon the ratchet-tooth with which the pawl may be in contact.

What I claim as new is—

1. The combination of the pulley C and nut D, one having a pawl and the other ratchet-teeth, with the shaft A, whereby the nut serves the double purpose of securing the wheel on the shaft and forming one part of the clutch, substantially as described.

2. The combination, with the revolving shaft A, provided with the cone B, of the pulley C, having an aperture loosely fitting said cone, and the nut D, for securing the pulley on the cone B, substantially as described.

3. The combination of the pulley C and the nut D, one having a pawl and the other ratchet-teeth, with the shaft A, having a cone, B, fitting in an aperture in the pulley, substantially as described.

In testimony whereof I affix my signature in presence of two witnesses.

ELBERT D. WEYBURN.

Witnesses:
 WM. M. SMITH,
 GEO. F. GRAHAM.